US006143111A

United States Patent [19]

Biagiotti

[11] Patent Number: 6,143,111

[45] **Date of Patent: *Nov. 7, 2000**

[54] DEVICE FOR GLUING THE TAIL END OF A REEL OF WEB MATERIAL

[75] Inventor: Guglielmo Biagiotti, Lucca, Italy

[73] Assignee: Fabio Perini S.p.A., Lucca, Italy

[ * ] Notice: This patent is subject to a terminal disclaimer.

[21] Appl. No.: 08/997,586

[22] Filed: Dec. 23, 1997

Related U.S. Application Data

[63] Continuation of application No. 08/652,431, filed as application No. PCT/IT94/00202, Dec. 5, 1994, Pat. No. 5,716,489.

[30] Foreign Application Priority Data

Dec. 10, 1993 [IT] Italy .................................. FI93A0254

[51] Int. Cl.[7] ............................ B32B 31/00; B65H 81/00

[52] U.S. Cl. .......................... 156/152; 156/191; 156/446; 156/578; 118/243

[58] Field of Search .................................... 156/152, 187, 156/191, 443, 446, 448, 449, 456, 578; 118/243

[56] References Cited

U.S. PATENT DOCUMENTS

| | | | |
|---|---|---|---|
| 1,967,751 | 7/1934 | Goerlich | 118/241 |
| 2,755,768 | 7/1956 | Olson . | |
| 3,393,105 | 7/1968 | Tellier, Jr. . | |
| 3,415,221 | 12/1968 | Stenger . | |
| 4,102,304 | 7/1978 | Debenham . | |
| 4,366,018 | 12/1982 | Gross . | |
| 4,475,974 | 10/1984 | Perini . | |
| 5,169,447 | 12/1992 | Jonovic et al. | 118/211 |
| 5,242,525 | 9/1993 | Biagiotti . | |
| 5,716,489 | 2/1998 | Biagiotta | 156/443 |
| 5,759,326 | 6/1998 | Vigneau | 156/191 |

FOREIGN PATENT DOCUMENTS

| | | | |
|---|---|---|---|
| 0 481 929 A1 | 4/1992 | European Pat. Off. . | |
| 1 511 046 | 10/1970 | Germany . | |
| 1 632 170 | 11/1970 | Germany . | |
| 25 18 902 | 11/1976 | Germany . | |
| 50-35562 | 11/1975 | Japan . | |
| 2 098 092 | 11/1982 | United Kingdom . | |
| 2158371 | 11/1985 | United Kingdom | B05C 3/18 |

*Primary Examiner*—Richard Crispino
*Assistant Examiner*—Sue A. Purvis
*Attorney, Agent, or Firm*—Breiner & Breiner

[57] ABSTRACT

A device for gluing the tail end of a reel of wound web material including conveying means for moving the reel, unwinding means for unwinding the tail end of the web material, a dispenser of glue for applying the glue to the reel, and means for rewinding the tail end after the glue has been applied. The dispenser includes an upwardly oriented aperture from which the glue is dispensed and includes a container for the glue with the upwardly oriented aperture and a moving member positioned inside the container which is immersed in the glue contained in the container and moved towards the upwardly oriented aperture in order to dispense the glue to the reel as it rolls over the aperture.

12 Claims, 3 Drawing Sheets

DEVICE FOR GLUING THE TAIL END OF A REEL OF WEB MATERIAL

This is a continuation of application Ser. No. 08/652,431 filed May 24, 1996, now U.S. Pat. No. 5,716,489, which is a 371 of PCT/IT94/00202 filed Dec. 5, 1994.

TECHNICAL FIELD

The invention relates to a device for gluing the tail end of a reel or log of wound web material, of the type comprising: conveying means for moving the reel; unwinding means for unwinding the tail end of the web material; a dispenser of glue for applying a glue to the web material of the reel; and means for rewinding the reel after the glue has been applied. More particularly, the invention relates to a device of the above type in which the glue is applied to a portion of material still wound on the reel and onto which the tail or outer end is then rewound.

Such devices are commonly used in the paper converting industry, wherein large paper coils (parent rolls) are unwound and rewound to form reels or logs of smaller diameters. The tail end of these reels is glued after rewinding and the reels are thereafter subject to further operations, such as cutting along planes perpendicular to the reel axis, in order to produce toilet paper rolls, all purpose wipers rolls, kitchen rolls or the like.

STATE OF THE ART

Various kinds of reel gluing devices exist, and, purely by way of illustration, those disclosed in, for example, U.S. Pat. No. 4,475,974, U.S. Pat. No. 4,963,223, EP-A-0 481 929 and U.S. Pat. No. 5,242,525 may be indicated. In all currently known gluing devices, and in particular in those disclosed in the patents cited above, the unwinding of the tail end of the web material before gluing takes place is achieved by holding the reel in an unwinding position and striking said reel with blasts of air emitted by nozzles in suitable positions and orientations. These blasts of air lift the tail end of the reel and open it onto a supporting surface. The reel is then made to rotate in order partly to rewind the tail end so that a predetermined and limited length of web material remains on the supporting surface. Once this has been done it is necessary to transfer the reel with the tail end in this position to the glue dispenser. In conventional gluing devices, disclosed for example in U.S. Pat. No. 4,963,223 or in U.S. Pat. No. 4,475,974, the reel is transferred by translationally moving a pair of rolls on which the reel is supported and, integrally with said rolls, the surface on which the tail end has been unwound. This is necessary because the glue is dispensed through nozzles directly onto the tail end which is then rewound onto the reel. In order to considerably simplify the gluing process, EP-B-0 481 929 discloses a novel gluing process, in which once the tail end has been unwound from the reel, the reel is rolled over a slit through which the glue is dispensed. This makes it possible to achieve major simplifications and to greatly reduce maintenance, if not eliminate it altogether.

The present invention relates to a tail sealer using the same method as disclosed in EP-B-0 481 929, with a modified glue dispenser.

DISCLOSURE OF THE INVENTION

Basically, the device according to the invention comprises a glue dispenser which includes a glue container with at least one upwardly oriented slit from which glue is dispensed, wherein inside said container a moving member is positioned, which is cyclically immersed in the glue and moved toward the upwardly oriented slit in order to apply the glue on the reel which rolls over said slit.

In a particularly advantageous embodiment, said container is upwardly closed by a rolling surface on which the reels to be glued are made to roll, said surface being provided with said at least one upwardly oriented slit.

According to an embodiment of the invention, the movable member is formed by a transversely extending, substantially rectilinear bar. Said movable member may be provided with an upwardly oriented concave surface, in which the glue is collected.

Further advantageous features of the invention are set forth in the appended claims.

The invention also relates to a method for gluing the outer end of a web material wound on a reel, wherein: the outer end of the web is unwound or detached from the reel by a predetermined extent; the glue is applied on a region of the web material which is still wound up on the reel by rolling said reel, with the outer end being unwound therefrom, along a rolling surface and over a slit from which the glue is dispensed; and the outer end is rewound on the reel while the reel is rolling along the rolling surface. While the reel is rolling over the upwardly oriented slit, glue is dispensed therefrom by a movable member which is cyclically immersed into a glue container to pick up a certain amount of glue.

BRIEF DESCRIPTION OF THE DRAWINGS

The invention will be understood more clearly from a perusal of the description and enclosed drawing, the latter showing a practical, non-limiting embodiment of the invention. In the drawing.

DETAILED DESCRIPTION OF THE INVENTION

Figure 1:
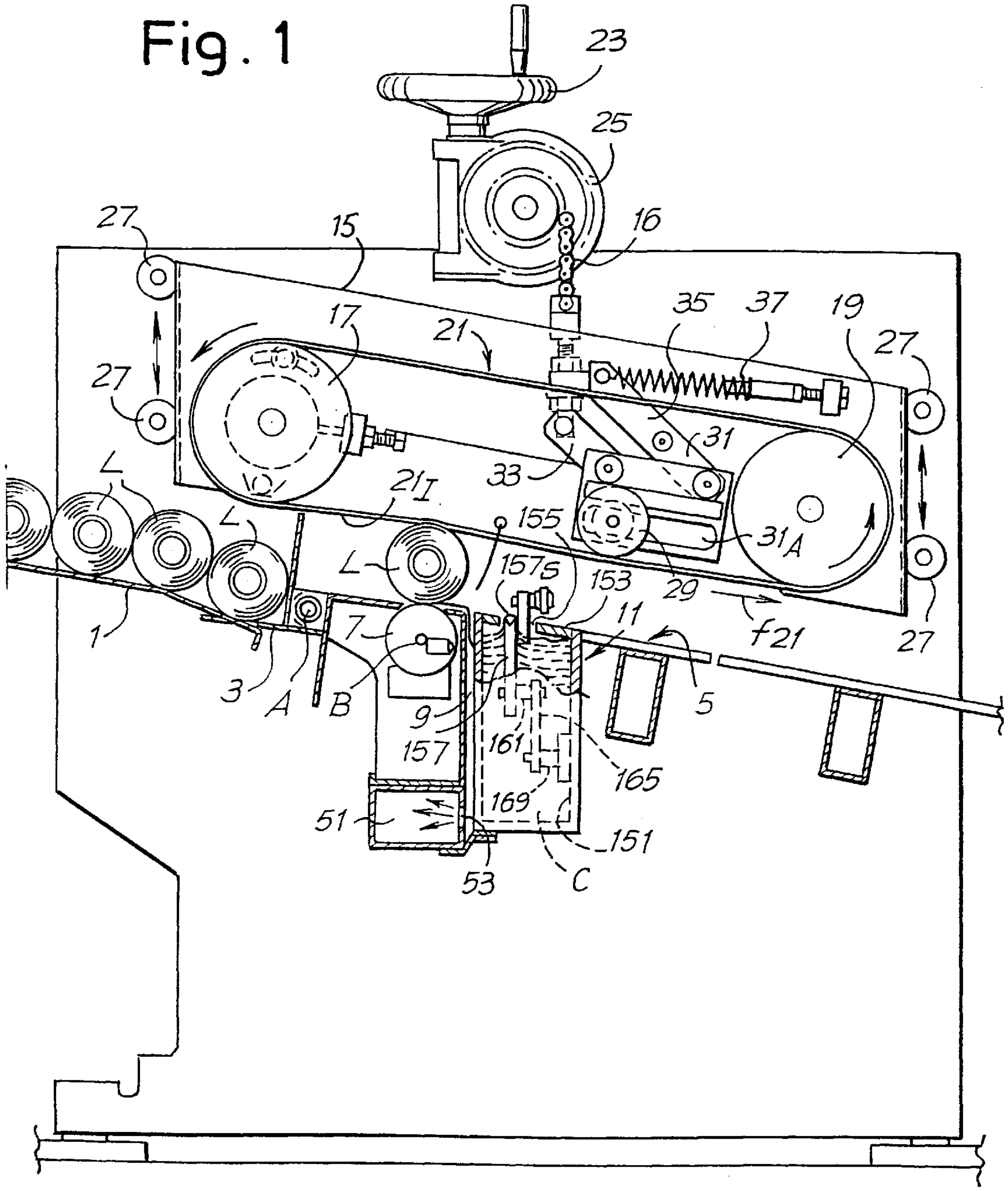
FIG. 1 shows a side view of the device according to the invention.

The device according to the invention comprises an entry chute 1, on which the reels L arrive in succession from a re-reeling machine positioned upstream of the device, and not shown. In the accompanying figures the reels L are of the type having a central winding core, but it is obvious that the working of the device of the present invention will not be changed if it is used for gluing reels that have no central winding core.

The numeral 3 indicates a feeder rotating about an axis A, which transfers one reel at a time from the chute 1 to a supporting and conveying surface indicated as a whole by the numeral 5. Downstream of the feeder 3, the surface 5 comprises an aperture from which the upper surface of an unwinding roll 7, rotating about a fixed axis marked 3, projects slightly. Downstream of the unwinding roll 7 (which in the example illustrated rotates anticlockwise) is a vacuum space 9 leading down underneath the surface 5. Positioned downstream of the mouth of the space 9 is the glue dispenser, indicated 11 as a whole. The dispenser is positioned underneath a dispensing aperture or slit 13 formed along the supporting and. conveying surface 5. The latter then continues towards the reel discharge area where there are collecting means (not shown) which take the glued reels and transfer them to the cutting machine which cuts up the individual reels into a plurality of rolls of predetermined height.

Above the supporting and conveying surface 5 is an assembly 15 suspended by a chain 16 at a height that can be adjusted to suit the dimensions of the reels L for the purposes indicated below. The assembly 15 carries a pair of rolls 17, 19 around which a flexible drive 21, consisting of one or a series of belts or the like travels. The flexible drive 21 has a lower half 21I that runs approximately parallel with the reel supporting and conveying surface 5. The distance from the lower half 211 to the surface 5 is adjustable by means of a system comprising a handwheel 23 and a speed-reducing mechanism 25, by means of which the assembly 15 can be moved vertically, guided laterally by means of rolls 27 and relevant tracks. The handwheel 23 and the speed-reducing mechanism 25 may also be replaced by a geared-down motor or the like.

Between the upper and lower halves of the flexible drive 21 is a pressure roll 29 mounted on a unit 31 which in turn is supported by links 33, 35 connected to a spring-loaded member 37 which pushes the pressure roll 29 down against the lower half 21I of the flexible drive 21. The unit 31 has a slot 31A along which the pressure roll 29 can be positioned in order to alter its position relative to the glue dispenser 11.

Communicating with the vacuum space 9 is a vacuum box 51 connected to a vacuum line (not shown). The vacuum box 51 extends across approximately the entire width of the device, at right angles to the plane of the figures, and has an opening or a plurality of openings 53 permitting communication between the box 51 and the vacuum space 9. The openings 53 are located in the lower part of the vacuum space 9.

Figure 2:
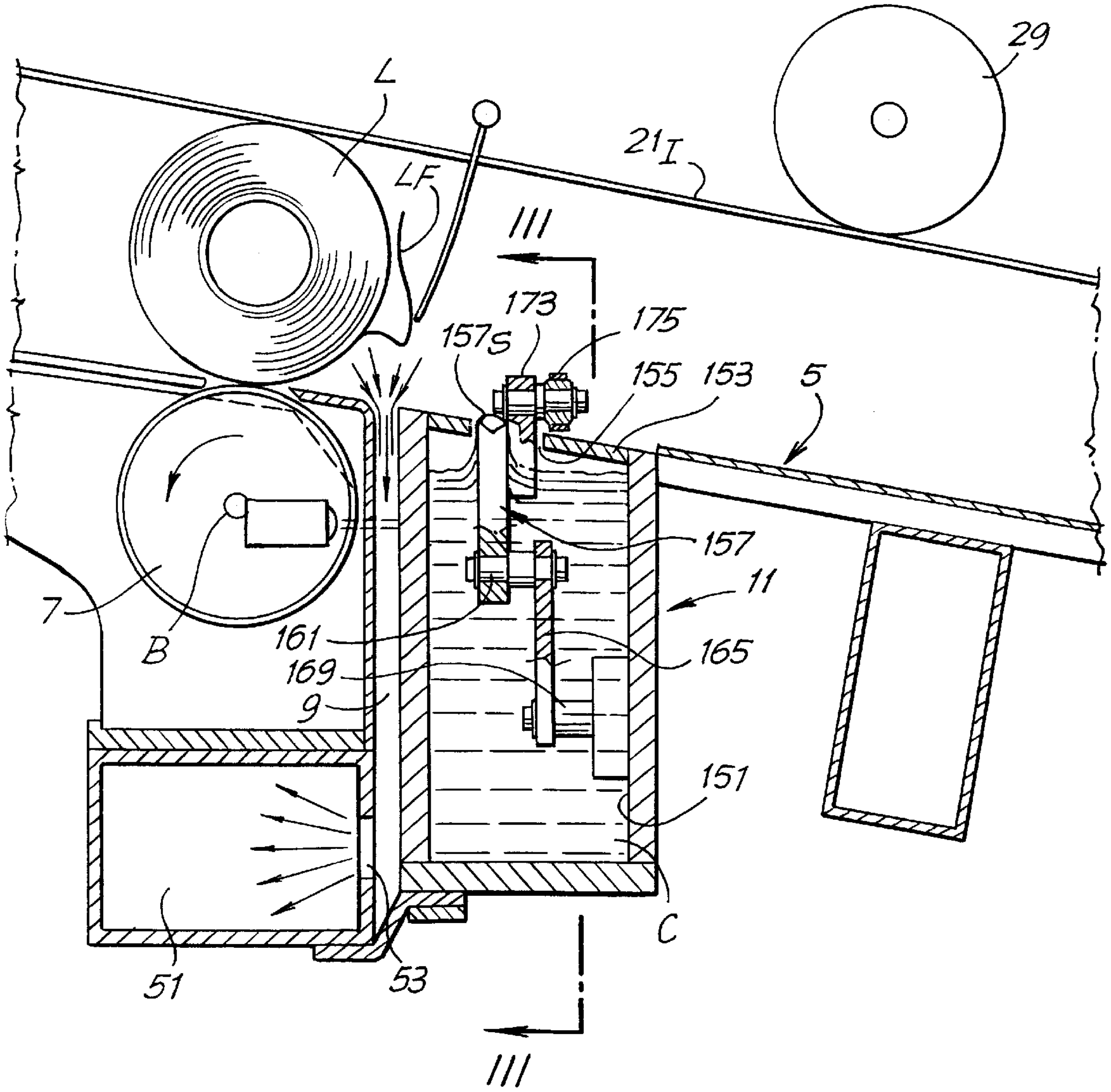
FIG. 2 shows an enlarged side view and partial longitudinal section of the glue dispensing area of the device.

Each individual reel L is taken from the chute 1 by the rotating feeder 3 and unloaded onto the supporting and conveying surface 5. The rotation of the feeder 3 about its axis A forces the reel between the supporting and conveying surface 5 and the lower half 21I of the flexible drive 21. Said flexible drive is driven in the direction shown by the arrow f21 by one of the rolls 17, 19, which for this purpose is powered in some way. Thus the reel L is rolled in a controlled manner along the first portion of the supporting and conveying surface 5. After rolling a certain distance over the surface 5, the reel L comes into contact with the upper portion of the unwinding roll 7, which projects from the surface 5. This is shown in FIG. 2. When the reel reaches this position, it begins to rotate about its axis, clockwise in the drawing, while remaining in the same position. This is obtained by moving the belts 21 at the same speed as the roll 7. Meanwhile the vacuum space 9 is in depression because of the suction exerted by the vacuum box 151. Consequently, when the tall end LF appears on the right hand side (in FIG. 2) of the reel L, it is detached from the external surface of the reel L, unwound from it and sucked into the vacuum space 9. FIG. 2 shows the tail end LF as it first comes away from the external surface of the reel L while FIG. 1 shows the position assumed by the tail end LF once sucked into the vacuum space 9. The roll 7 continues to rotate even when the tail end LF is inside the vacuum space 9 and therefore said end is gradually drawn out and rewound onto the reel L until the terminal edge of the tail end LF is in front of a sensor, which may be optical or the like. The position of the sensor can be adjusted to alter the length of tail end unwound. Alternatively (or in combination), the adjustment of the length of the tail end can be brought about by appropriately delaying the stopping of the rotating of the roll 7 relative to the signal from the sensor. This sensor, when it detects the position of the tail end, stops the roll 7 from rotating, thereby causing the reel to advance in a controlled manner and to rotate on the surface 5 over the aperture 43 of the dispenser 11. The controlled movement of the reel is obtained by means of belt 21 which continues to move at constant speed. In this way the glue is applied to the reel in the location uncovered by the partial unwinding of the tail end LF.

As the translation movement of the lower half 211 of the flexible drive 21 is continued, the reel is caused to roll in a controlled manner along the supporting and conveying surface 5 from position underneath the pressure roll 29, which presses on the surface of the reel at the point where the tail end is to be stuck. The position of the pressure roll 29 is adjusted so as to act on the reel at the point where the glue has been applied, in order to guarantee a better closure without it being necessary to hold the reel in position, causing it to execute a complete revolution in this location.

The glued reel is subsequently discharged and a new reel is being processed in position L for its free end to be opened.

Figure 3:
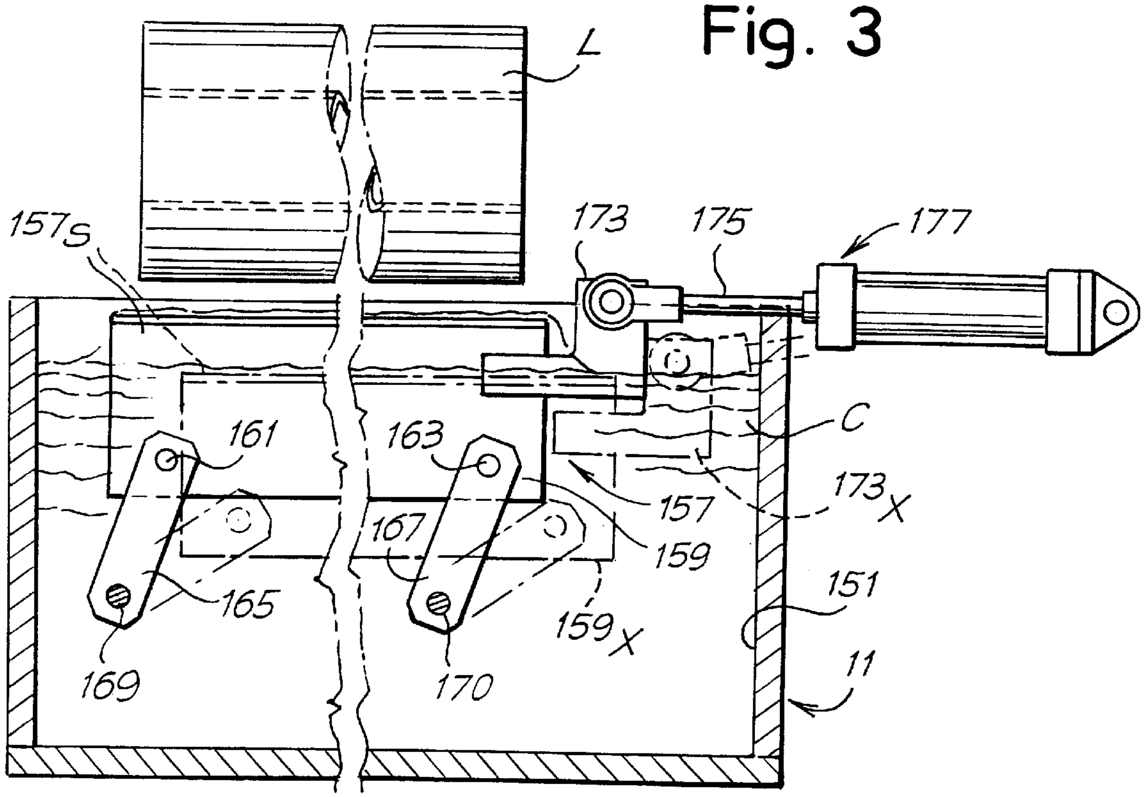
FIG. 3 shows a cross section according to line III—III in FIG. 2.

FIGS. 2 and 3 show the details of the glue dispenser 11. The dispenser 11 comprises a container 151 containing the glue C. The container is upwardly closed by a wall 153 with a dispensing slit or dispensing aperture 155 which opens in the surface 5 on which the reels are made to rotate. Inside the container 151 is a moving member 157 consisting of a transverse bar 159 hinged at 161 and 163 (FIG. 3) to a set of rockers, the first and the last of which are shown in FIG. 3, and designated 165, 167. The rockers are hinged at 169 and 170 to the wall of container 151. The bar 159 is connected, via a joint 173 to the shaft 175 of a cylinder-piston actuator 177. The actuator 177 generates a pivoting movement of rockers 165, 167 and thus a movement of bar 159 from the position shown in solid line in FIG. 3 to the position shown in broken lines and designated 159X in FIG. 3.

Upwardly the bar 159 is provided with a concave surface 157S which is in practice a longitudinal channel extending substantially along the whole length of the bar 159. When the bar is in its lower position, the surface 157S is immersed in the glue C, such that the subsequent lifting of the bar 159 caused by actuator 177 determines the lifting of a certain amount of glue which is collected in the channel formed by surface 157S. The dimension of the channel defines the amount of glue which is picked up by bar 159 at every stroke. The motion of bar 159 is synchronized with the feeding motion of the reels in such a way that the bar 159 is in its upper position when the reel L is made to roll along the supporting and rolling surface 5 over the dispensing aperture 155. When it rolls over the dispensing aperture 155 the reel collects the glue from the surface 157S and, continuing to roll its tail end is glued on the outer surface of the reel.

Figure 4:
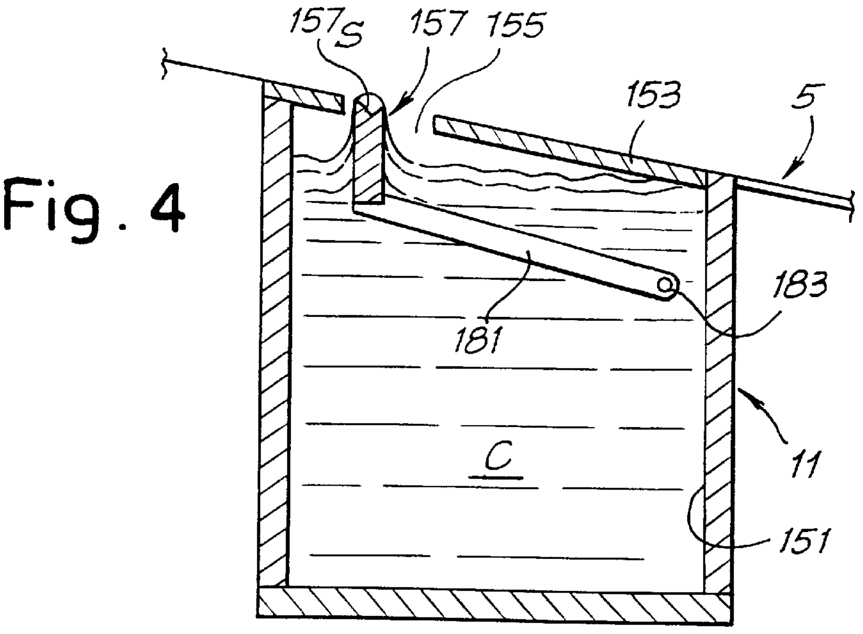
FIG. 4 shows a modified embodiment.

FIG. 4 shows a modified embodiment of the dispenser of FIGS. 2 and 3. In this embodiment the moving member 157 is supported by an oscillating arm 181 hinged at 183 to a transverse axis. The functioning of the dispenser of FIG. 4 is similar to that of the dispenser of FIGS. 2 and 3, the arm 181 being controlled e.g. by a brushless electric motor or other actuator, such as a fluid cylinder arranged outside the container 151. The arm could be shorter and made to continuously or intermittently rotate about a transverse axis arranged under the glue dispensing aperture.

The dispenser 11 has been described hereinabove in combination with a particular kind of reel feeding and tail end unwinding system. However, it should be understood that the same dispenser can be combined with different reel feeding and tail end unwinding means. In particular, it can be used in tail sealers of the kind described in EP-A-0.481.929 or U.S. Pat. No. 5,242,525. It is also possible to adopt other reel moving and tail unwinding means, such as those used in tail sealers models N. 65.30, 65.31 and 65.40 (U.S. Pat. No. 4,963,223) produced by the applicant, wherein the reels are moved from the tail unwinding station to the gluing station by oscillating a pair of reel supporting rolls.

A similar dispenser can be used for appling glue to the tubular cores on which the web is wound to form a reel, before the core is introduced in the rewinder.

It will be understood that the drawing shows only an illustrative embodiment provided purely by way of a practical demonstration of the invention, it being possible to vary said invention as regards shapes and arrangements, yet without departing from the scope of the concept underlying the invention. Any reference numerals in the accompanying claims are purely for facilitating the reading of the claims with reference to the description and to the drawing, and do not limit the scope of protection represented by the claims.

What is claimed is:

1. A tail sealing apparatus for gluing a tail end of a reel of wound web material comprising:

a reel supporting and conveying surface;

a glue dispenser for providing glue to be applied to said reel, said glue dispenser including a container for the glue which has an upwardly oriented aperture; and a glue applicator, said glue applicator being constructed and arranged to be alternately immersed in the glue contained in the container and movable towards and in relation to said upwardly oriented aperture such that when the reel while in nonstop rolling motion rolls over the aperture, said glue applicator transfers glue to a portion of an outer surface of said reel.

2. The apparatus according to claim 1 wherein said glue applicator includes an upward facing concave surface on which the glue to be applied is collected.

3. The apparatus according to claim 1 wherein said glue applicator is comprised of a transverse and substantially rectilinear member which applies the glue to said reel.

4. A tail sealing apparatus for gluing tail end of a reel of wound web material comprising;

a glue dispenser for providing glue to be applied to said reel, said glue dispenser including a container for the glue which has an upwardly oriented aperture;

a glue applicator, said glue applicator being constructed and arranged to be alternately immersed in the glue contained in the container and movable towards and in relation to said upwardly oriented aperture such that when the reel rolls over the aperture, said glue applicator transfers glue to a portion of an outer surface of said reel; and a pressure applicator which ensures adhesion of said tail end to the glue applied by said glue applicator.

5. A tail sealing apparatus for gluing a tail end of a reel of wound web material comprising;

a glue dispenser for providing glue to be applied to said reel, said glue dispenser including a container for the glue which has an upwardly oriented aperture;

a glue applicator, said glue applicator being constructed and arranged to be alternately immersed in the glue contained in the container and movable towards and in relation to said upwardly oriented aperture such that when the reel rolls over the aperture, said glue applicator transfers glue to a portion of an outer surface of said reel; and a first roller assembly for unwinding the tail end of the reel.

6. The apparatus according to claim 5, further comprising a second roller assembly for moving said reel along a path.

7. The apparatus according to claim 6 wherein said first roller assembly and said second roller assembly comprise a lower roller assembly and an upper roller assembly, respectively.

8. The apparatus of claim 7 wherein said upper roller assembly includes a belt which contacts said reel.

9. A method for gluing a tail end of a web material wound to form a reel, said method comprising (a) positioning the reel of web material between two roller mechanisms;

(b) rotating said reel so as to expose said tail end to a vacuum source which attracts said tail end;

(c) unwinding a predetermined length of said tail end while said tail end is attracted by said vacuum source;

(d) providing an upwardly oriented aperture from which glue is applied to said reel;

(e) providing a glue container underneath said aperture;

(f) providing a glue applicator constructed and arranged to be alternately immersed in glue contained in said container and movable towards and in relation to said aperture such that when the reel rolls over said aperture said glue applicator transfers glue to a portion of an outer surface of said reel;

(g) rolling said reel across said aperture from which glue is applied to said reel; and (h) further rotating said reel such that said predetermined length of said tail end is re-wound on said reel.

10. The method according to claim 9 further comprising the step of (i) applying pressure to said reel in the area in which glue was applied to said reel to promote the adherence of said tail end to said reel.

11. The method according to claim 9 wherein said reel is unwound by contacting said reel with an upper winding assembly and a lower winding assembly.

12. The method according to claim 11 wherein said reel is contacted by a belt which forms a portion of said upper winding assembly.

* * * * *